US008599183B2

(12) United States Patent
Yeo

(10) Patent No.: US 8,599,183 B2
(45) Date of Patent: Dec. 3, 2013

(54) LIQUID CRYSTAL DISPLAY DEVICE FOR PREVENTING ABNORMAL DRIVE OF LIQUID CRYSTAL MODULE

(75) Inventor: Inho Yeo, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 388 days.

(21) Appl. No.: 12/457,987

(22) Filed: Jun. 26, 2009

(65) Prior Publication Data

US 2010/0123701 A1 May 20, 2010

(30) Foreign Application Priority Data

Nov. 19, 2008 (KR) ........................ 10-2008-0115175

(51) Int. Cl.
*G06F 3/038* (2013.01)
*G09G 3/36* (2006.01)

(52) U.S. Cl.
USPC .......................................... 345/211; 345/102

(58) Field of Classification Search
USPC ........................... 345/87–102, 211–213, 204
See application file for complete search history.

(56) References Cited

U.S. PATENT DOCUMENTS

| | | | | |
|---|---|---|---|---|
| 4,848,876 | A * | 7/1989 | Yamakawa | 345/87 |
| 6,621,489 | B2 * | 9/2003 | Yanagisawa et al. | 345/211 |
| 7,109,966 | B2 * | 9/2006 | Abe et al. | 345/100 |
| 7,446,750 | B2 * | 11/2008 | Moon | 345/102 |
| 7,990,373 | B2 * | 8/2011 | Xiao et al. | 345/211 |
| 2001/0022584 | A1 * | 9/2001 | Tsugawa | 345/211 |
| 2005/0206635 | A1 * | 9/2005 | Hashimoto | 345/204 |
| 2008/0117162 | A1 * | 5/2008 | Song et al. | 345/102 |

FOREIGN PATENT DOCUMENTS

| | | | |
|---|---|---|---|
| KR | 10-1999-0044955 | A | 6/1999 |
| KR | 10-2004-0000781 | A | 1/2004 |
| KR | 10-2004-0100861 | A | 12/2004 |

* cited by examiner

*Primary Examiner* — Chanh Nguyen
*Assistant Examiner* — James Nokham
(74) *Attorney, Agent, or Firm* — McKenna Long & Aldridge LLP

(57) ABSTRACT

A liquid crystal display device is provided to prevent a liquid crystal module from being driven abnormally. The liquid crystal display device comprises a liquid crystal display panel displaying a picture corresponding to a data; a DC-DC converter for generating driving voltages necessary for driving the liquid crystal display panel; a system for supplying the data, a module operation power and a backlight operation power in a play state, and cutting off the module operation power and the backlight operation power while supplying the data in a pause state; and a switching circuit for controlling an input of the DC-DC converter whether or not the module operation power and the backlight operation power are supplied, wherein the input of the DC-DC converter is cut-off if either the module operation power or the backlight operation power is not input to the switching circuit.

3 Claims, 5 Drawing Sheets

LIQUID CRYSTAL DISPLAY DEVICE FOR PREVENTING ABNORMAL DRIVE OF LIQUID CRYSTAL MODULE

This application claims the benefit of Korea Patent Application No. 10-2008-115175 filed on Nov. 19, 2008, which is incorporated herein by reference for all purposes as if fully set forth herein.

BACKGROUND OF THE INVENTION

1. Field of the Invention

This invention relates to a liquid crystal display device to prevent a liquid crystal module from being driven abnormally.

2. Discussion of the Related Art

A liquid crystal display device displays a picture corresponding to a video signal by controlling a light transmittance of a liquid crystal layer using an electric field applied to the liquid crystal layer. The liquid crystal display device is a kind of a flat panel display device having light, thin, and lower power consumption characteristic and so on, and has been used in portable computers such as a notebook computer, office automation products, audio products and video products. In particular, an active matrix type liquid crystal display device in which a switching element is formed in each of liquid crystal elements is very excellent in implementation of moving pictures because the switching element can be actively controlled.

A thin film transistor (TFT) is usually used as the switching element of the active matrix type liquid crystal display device. FIG. 1 shows an equivalent circuit of a pixel of the active matrix type liquid crystal display device in which the TFT is used as the switching element.

Referring to FIG. 1, the active matrix type liquid crystal display device converts a digital video data into an analog data voltage based on a gamma reference voltage, provide a data line DL with the analog data voltage, and provide a gate line GL with a scan pulse, thereby charging the data voltage into a capacitor. For this purpose, a gate electrode of the TFT is connected to the gate line GL, a source electrode of the TFT is connected to the data line DL and a drain electrode of the TFT is connected to a pixel electrode of a liquid crystal cell Clc and one electrode of a storage capacitor Cst. Also, a common electrode of the liquid crystal cell Clc is connected to a common voltage source so that common voltage Vcom is supplied to the liquid crystal cell Clc. Herein, the storage capacitor Cst maintains a voltage of the liquid crystal cell Clc constantly using a data voltage supplied from the data line DL when the TFT is turned on. When a scan pulse is supplied to the gate line GL to form a channel between the source and drain electrodes of the TFT, the data voltage supplied to the data line DL is applied to the pixel electrode of the liquid crystal cell Clc. At this time, liquid crystal molecules of the liquid crystal cell Clc are rearranged by the electric field formed between the pixel electrode and the common electrode of the liquid crystal cell Clc, thereby altering incident light.

For the above-mentioned operation, the liquid crystal display device comprises a liquid crystal module 20 for displaying pictures and a system 10 for generating driving signals necessary for driving the liquid crystal module 20 as shown in FIG. 2. FIG. 2 shows a block diagram of a related art liquid crystal display device.

The system 10 generates a data signal DATA, a module operation power VCC, a backlight operation power Vinv and so on, and supplies them to the liquid crystal module 20.

The liquid crystal module 20 comprises a timing controller 21, a DC-DC converter 22, a panel driving circuit 23, a liquid crystal display panel 24, a backlight driving circuit 25 and a backlight unit 26. The timing controller 21 is driven by the module operation power VCC. The timing controller 21 also rearranges the data signal DATA from the system 10, supplies it to the panel driving circuit 23 and controls an operation timing of the panel driving circuit 23 using a plurality of control signals. The DC-DC converter 22 is operated by the module operation power VCC supplied from the system 10 and generates a plurality of driving voltages necessary for driving the panel driving circuit 23. The panel driving circuit 23 drives data lines and gate lines formed in the liquid crystal display panel 24 according to the control signals from the timing controller 21 and the driving voltages from the DC-DC converter 22. The backlight driving circuit 25 is driven by the backlight operation power Vinv from the system 10 and generates a backlight driving voltage necessary for driving the backlight unit 26. The backlight unit 26 is driven by the backlight driving voltage and irradiates light on the liquid crystal display panel 24.

The related art liquid crystal display device is sometimes driven in a pause state in place of being continuously driven. For example, in case that the liquid crystal display device is applied to a navigation device, it is necessary to be operated only at the time when an user wants a navigation service. That is, in case that the user does not want a navigation service, it is desirable for the operation of the liquid crystal module 20 to be paused in order to save the consumption power. In general, in the pause mode, the module operation power VCC and the backlight operation power Vinv applied to the liquid crystal module 20 are cut off, but the data signal is continuously supplied to the liquid crystal module 20 in order to reduce a loading time of the system 10 when the navigation service restarts.

However, although the module operation power VCC and the backlight operation power Vinv applied to the liquid crystal module 20 are cut off in the pause mode, there is an abnormal phenomenon in an operation of the liquid crystal display panel 24 because the DC-DC converter 22 and the panel driving circuit 23 are driven by the data signal DATA induced along an operation power supplying line 12. Referring to FIG. 3, diodes for electrostatic discharge (ESD) are mounted in the timing controller 21 to protect circuit elements from internal static electricity. The diodes consists of a first diode D1 connected between a data bus line 11 to which the data signal DATA is supplied and a ground voltage supplying line 13, and a second diode D2 connected between the operation power supplying line 12 and the data bus line 11. The second diode D2 functions as a current path between the data bus line 11 and the operation power supplying line 12. Accordingly, even if the module operation power VCC is cut off, the data signal DATA is induced in the operation power supplying line 12. Herein, the data signal DATA has a voltage level (e.g., 2.6 volts) deducted by a threshold value of the second diode D2 from a transistor-transistor logic (TTL) level (e.g. 3.3 volts). As the operation power supplying line 12 is electrically connected to the DC-DC converter 22 as well as the timing controller 21, the DC-DC converter 22 and the timing controller 21 are driven by the induced data signal DATA in the state the module operation power VCC is cut off, thereby driving the liquid crystal display module 24. In case of continuing the situation, it is impossible to obtain an effectiveness of reducing consumption of power in the liquid crystal display module 20.

SUMMARY OF THE INVENTION

Exemplary embodiments of the invention provide a liquid crystal display device in which an abnormal operation of a liquid crystal module is prevented, thereby reducing a consumption power.

Additional features and advantages of the exemplary embodiments of the invention will be set forth in the description which follows, and in part will be apparent from the description, or may be learned by practice of the exemplary embodiments of the invention. The objectives and other advantages of the exemplary embodiments of the invention will be realized and attained by the structure particularly pointed out in the written description and claims hereof as well as the appended drawings.

In one aspect, a liquid crystal display device comprises, a liquid crystal display panel displaying a picture corresponding to a data; a DC-DC converter for generating driving voltages for driving the liquid crystal display panel; a system for supplying the data, a module operation power and a backlight operation power in a play state, and cutting off the module operation power and the backlight operation power while supplying the data in a pause state; and a switching circuit for controlling an input of the DC-DC converter depending on whether or not the module operation power and the backlight operation power are supplied, wherein the input of the DC-DC converter is cut-off if either the module operation power or the backlight operation power is not input to the switching circuit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Hereinafter, exemplary embodiments of the invention will be described in detail with reference to the accompanying drawings so that this disclosure is thorough and complete and fully conveys the concept of the invention to those skilled in the art. This invention may, however, be embodied in many different forms and should not be construed as being limited to the embodiments set forth herein.

Figure 1:
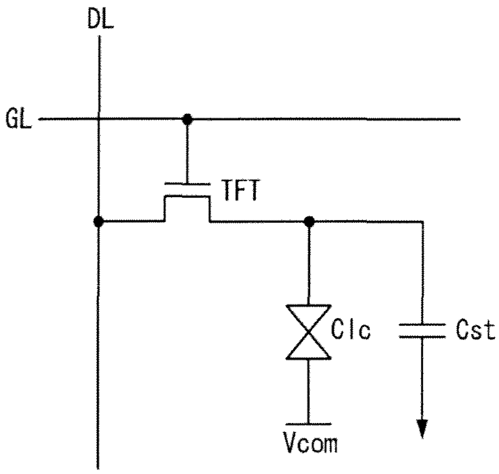
FIG. 1 RELATED ART
FIG. 1 is an equivalent circuit of a pixel of the liquid crystal display device.
Figure 2:
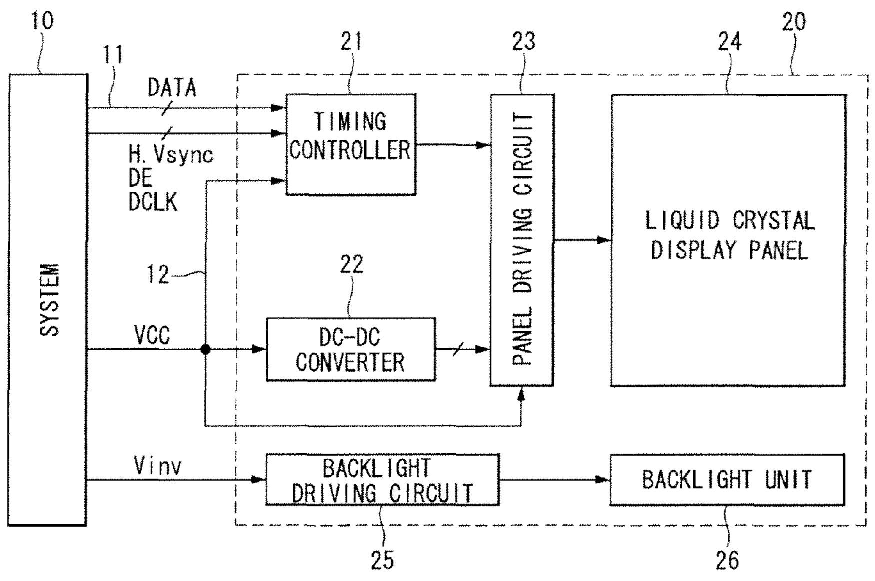
RELATED ART FIG. 2
FIG. 2 is a block diagram illustrating a liquid crystal display device of a related art.
Figure 3:
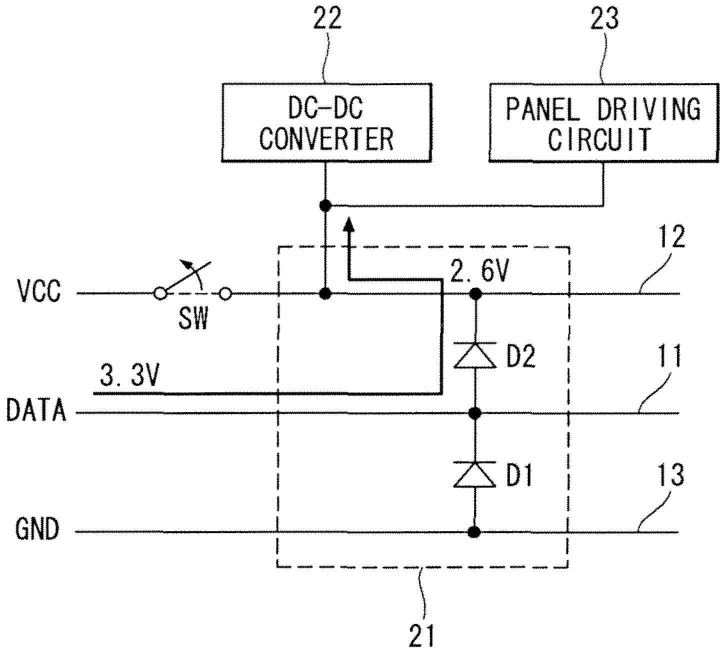
RELATED ART FIG. 3
FIG. 3 is a drawing explaining an abnormal driving of the liquid crystal display device when a DC-DC converter and a panel driving circuit are driven by an induced data signal.
Figure 4:
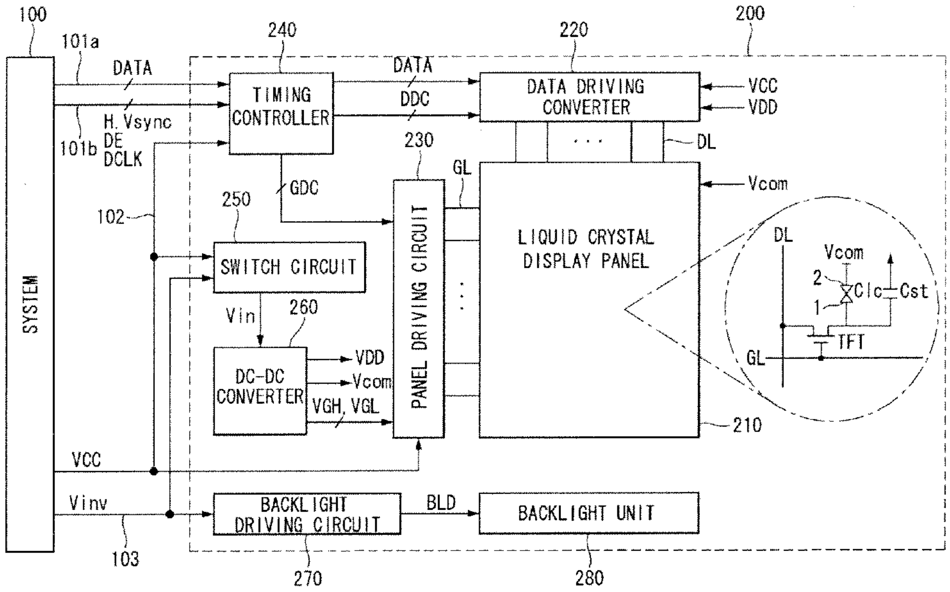
FIG. 4 is a block diagram illustrating a liquid crystal display device according to an embodiment of the invention.
Figure 5:
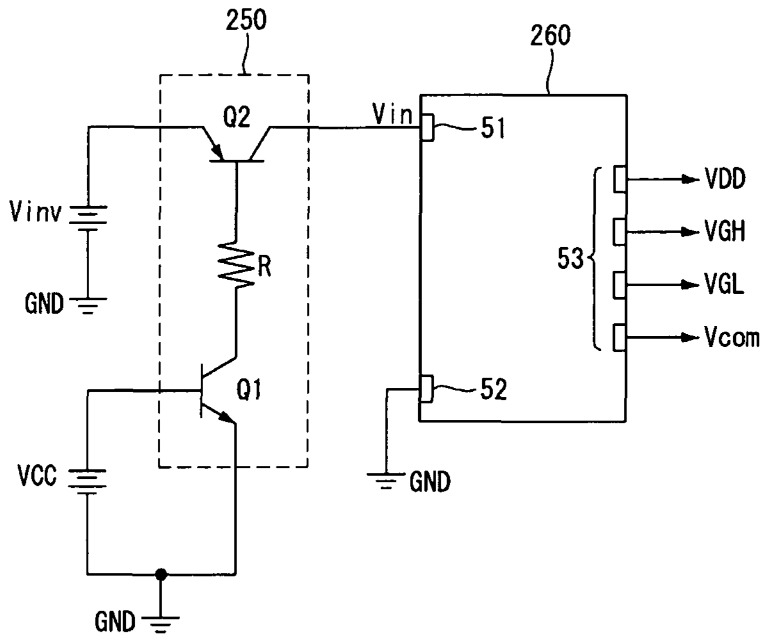
FIG. 5 is a circuit diagram illustrating an example of a switch circuit and the DC-DC converter.
Figure 6:
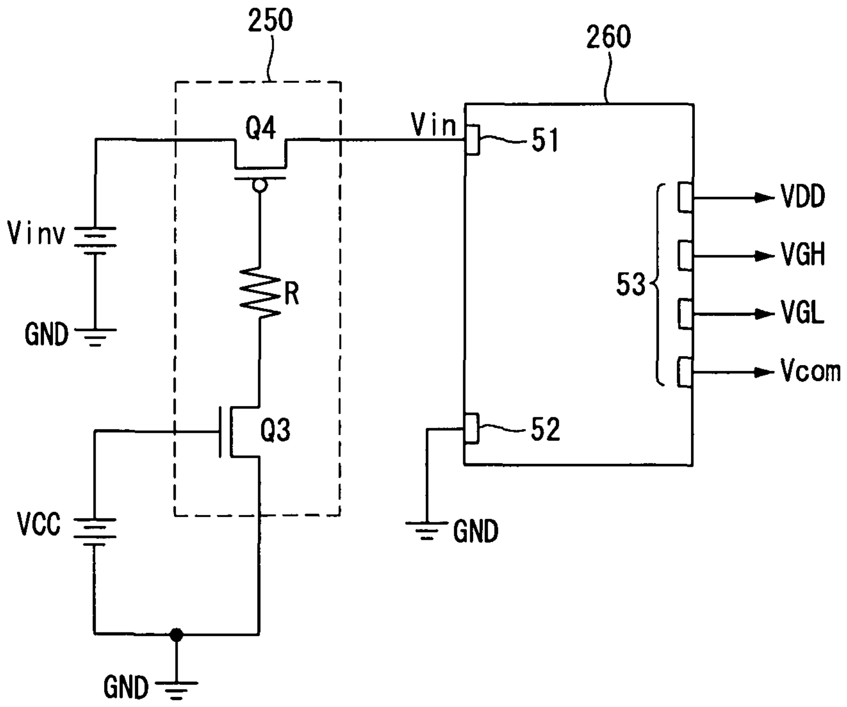
FIG. 6 is a circuit diagram illustrating another example of the switch circuit and the DC-DC converter.

Hereinafter, Reference will now be made in detail embodiments of the invention examples of which are illustrated in FIG. 4 to FIG. 6.

FIG. 4 is a block diagram illustrating a liquid crystal display device according to an embodiment of the invention.

Referring to FIG. 4, the liquid crystal display device according to an embodiment of the invention comprises a liquid crystal module 200 displaying pictures and a system 100 for generating driving signals necessary for driving the liquid crystal module 200.

The system 100 comprises a graphic processing part, a timing signal generating part and a power generating part. The graphic processing part converts an analog video data from an external into a digital video data DATA and adjusts a resolution and a color temperature of the digital video data. The timing signal generating part generates timing signals including horizontal/vertical synchronizing signals Hsync and Vsync, a data enable signal DE, a dot clock signal DCLK and so on. The power generating part generates a module operation power VCC necessary for operating the liquid crystal module 200 and a backlight operation power Vinv.

The liquid crystal module 200 comprises a liquid crystal display panel 210, a data driving circuit 220, a gate driving circuit 230, a timing controller 240, a switching circuit 250, a DC-DC converter 260, a backlight driving circuit 270 and a backlight unit 280.

A liquid crystal layer is formed between two glass substrates of the liquid crystal display panel 210. The liquid crystal display panel 210 comprises a plurality of data lines DLs, a plurality of gate lines GLs, and liquid crystal cells Clcs formed at which the data lines DLs and the gate lines GLs are crossed. On a lower glass substrate of the liquid crystal display panel 210, the data lines DLs, the gate lines GLs, thin film transistors TFTs and storage capacitors Csts are formed. The liquid crystal cells Clcs are connected to the TFTs respectively, and are driven by electric field between pixel electrodes 1 and common electrodes 2. On an upper glass substrate of the liquid crystal display panel 210, black matrices, color filters and common electrodes 2 are formed. The common electrodes 2 are formed on the upper glass substrate in a vertical electrical field driving mode such as a twisted nematic (TN) mode and a vertical alignment (VA) mode, but the common electrodes 2 are formed on the lower glass substrate together with the pixel electrodes in a horizontal electrical field driving mode such as in-plane switching (IPS) mode and fringe field switching (FFS) mode. On the lower and upper glass substrates, polarizers and alignment films are formed, respectively. The alignment films set a pre-tilt angle of liquid crystals.

The data driving circuit 220 is operated by the module operation power VCC supplied from the system 100 via a first power supplying line 102. In response to the digital control signal DDC from the timing controller 240, the data driving circuit 220 converts a digital video data DATA from the timing controller 240 into an analog gamma compensating voltage referring to a gamma reference voltage and supplies the analog gamma compensating voltage to the data lines DL as a data voltage. In order to generate the gamma reference voltage, the data driving circuit 220 comprises a plurality of data driving ICs. Each of the plurality of data driving ICs comprises a gamma resistor string which divides a high potential power voltage VDD supplied from the DC-DC converter 260. And also, in order to convert the digital video data DATA into the analog gamma compensating voltage, the data driving circuit 220 comprises a plurality of data driving ICs. Each of the plurality of data driving ICs comprises a shift register sampling the clock signal, a data register temporarily storing the digital video data DATA, a latch storing the digital video data by one line at a time in response to the clock signals from the shift registers and outputting the stored digital video data, a digital/analog converter selecting a positive polarity gamma compensating voltage or a negative polarity gamma compensating voltage corresponding to the digital video data from the latch by referring to the gamma reference voltage, a multiplexer selecting the data line to which the analog data converted by the positive polarity gamma compensating voltage or the negative polarity gamma compensating voltage is supplied, and an output buffer between the multiplexer and the data line DL.

The gate driving circuit 230 is operated by the module operation power VCC supplied from the system 100 via the first power supplying line 102. The gate driving circuit 230 supplies scan pulses to the gate lines GLs sequentially. Herein, each of the scan pulse selects a horizontal line of the liquid crystal display panel 210 to which the data voltage is supplied. The scan pulse is generated on the basis of a scan high voltage VGH and a scan low voltage VGL from the DC-DC converter 260. In order to generate the scan pulse, the gate driving circuit 230 comprises a plurality of gate driving ICs. Each of the plurality of gate driving ICs comprises a shift register, a level shifter converting an output signal from the shift register into a signal having a swing width adapted to drive the TFT, and an output buffer connected between the level shifter and the gate lines GLs.

The timing controller 240 is operated by the module operation power VCC supplied from the system 100 via the first power supplying line 102. Also, the timing controller 240 generates the data control signal DDC for controlling an operating timing of the data driving circuit 220 and the gate control signal GDC for controlling an operating timing of the gate driving circuit 230 by using the timing signals Hsync, Vsync, DE and DCLK. The data controlling signal DDC includes a source sampling clock instructing a latch operation of the digital video data DATA in the data driving circuit 220 on the basis of a rising edge or a falling edge, an source enable output signal instructing an output of the data driving circuit 220, a polarity controlling signal determining a polarity of the data voltage to be supplied to the liquid crystal cells of the liquid crystal display panel 210 and so on. The gate controlling signal GDC includes a gate start pulse instructing a start horizontal line from which a scan operation starts during one vertical period when one frame is displayed, a gate shift clock signal which is a timing controlling signal input to the shift register in the gate driving circuit 230, shifts the gate start pulses sequentially, and has a pulse width corresponding to an ON period of the TFT, a gate output enable signal instructing an output of the gate driving circuit 230, and so on.

Also, the timing controller 240 rearranges the digital video data DATA supplied from the system 100 via a data bus line **101*a* to be adapted to a resolution of the liquid crystal display panel 210 and supplies the rearranged digital video data to the data driving circuit 220**.

The switch circuit 250 controls the DC-DC controller 260 by using the module operation power VCC supplied from the system 100 via the first power supplying line 102 and the backlight operation power Vinv supplied from the system 100 via the second power supplying line 103. In other words, The switch circuit 250 supplies the input voltage Vin capable of operating the DC-DC converter 260 to the input terminal of the DC-DC converter 260 in a normal play state in which the module operation power VCC and the backlight operation power Vinv are supplied from the system 100. On the other hand, The switch circuit 250 shuts off the input voltage Vin to be supplied to the DC-DC converter 260 in a pause state in which either the module operation power VCC or the backlight operation power Vinv is not be supplied from the system 100. The switch circuit 250 will be described more concretely with reference to FIGS. 5 and 6.

The DC-DC converter 260 is operated by the input voltage Vin supplied from the switch circuit 250. The DC-DC converter 260 generates VDD voltage, Vcom voltage, VGH voltage and VGL voltage on the basis of the input voltage Vin. The VDD voltage is supplied to the gamma resistor string of the data driving circuit 220, the Vcom voltage is supplied to the common electrode of the liquid crystal cell Clc. The VGH voltage is supplied to the gate driving circuit 230 as a high logic voltage of the scan pulse which is set to a value larger than the threshold voltage of the TFT, and the VGL voltage is supplied to the gate driving circuit 230 as a low logic voltage of the scan pulse which is set to an OFF voltage of the TFT The backlight driving circuit 270 is driven by the backlight operation power Vinv supplied from the system 100 via the second power supplying line 103 and generates the backlight driving signal BLD necessary for driving the backlight unit 280. The backlight driving circuit 270 may include an inverter or a light emitting diode driver depending on a type of light sources incorporated into the backlight unit 280.

The back light unit 280 is operated by the backlight driving signal BLD and irradiates a light on the liquid crystal display panel 210.

FIGS. 5 and 6 are circuit diagrams illustrating examples of the switch circuit 250 and the DC-DC converter 260 shown in FIG. 4. In FIGS. 5 and 6, reference number 52 indicates a ground voltage terminal connected to a ground voltage source GND.

Referring to FIG. 5, the switch circuit 250 controls the operation of the DC-DC converter 260 by using the module operation power VCC and the backlight operation power Vinv supplied from the system 100. For this purpose, the switch circuit 250 includes first and second switching elements Q1 and Q2, and a resistor connected between the first switching element Q1 and the second switching element Q2, and controls the input voltage Vin supplied to the DC-DC converter 260.

Herein, the first switching element Q1 switches a current path between the resistor R and the ground power source GND depending on whether or not the module operation power VCC is applied to the first switching element Q1. The first switching element Q1 includes a control terminal connected to the first power supplying line 102 which supplies the module operation power VCC, a first terminal connected to the resistor R and a second terminal connected to the ground power source GND. The first switching element Q1 is implemented with a npn type bipolar junction transistor (BJT). The first switching element Q1 may be implemented with other elements except the npn type BJT if the other elements may perform the same function as the npn type BJT. For example, the first switching element Q1 may be implemented with a n-type metal oxide semiconductor field effect transistor (MOSFET) as shown in FIG. 6.

The second switching element Q2 is turned-on or turned-off in relation to the operation of the first switching element Q1, thereby switching a current path between the backlight operation power Vinv and the input voltage terminal 51 of the DC-DC converter 260. The second switching element Q2 includes a control terminal connected to the resistor R, a first terminal connected to the second power supplying line 103 to which the backlight operation power Vinv is supplied, and a second terminal connected to the input terminal of the DC-DC converter. The second switching element Q2 is implemented with a pnp type BJT. The second switching Q2 may be implemented with other elements except the pnp type BJT if the other elements may perform the same function as the pnp type BJT. For example, the second switching element Q2 may be implemented with a p-type MOSFET as shown in FIG. 6.

Hereinafter, the operation of the switching circuit 250 will be described.

The switching circuit 250 supplies the input voltage Vin necessary for operating the DC-DC converter 260 to the input terminal of the DC-DC converter 260 in a normal play state in which the module operation power VCC and the backlight operation power Vinv are supplied from the system 100 via the first and second power supplying lines 102 and 103 respectively, because the switching elements Q1 and Q2 are turned on. On the other hand, the switching circuit 250 prevents the input voltage Vin from providing to the input terminal of the DC-DC converter 260 if either the module operation power VCC or the backlight operation power Vinv is not input to the switching circuit 250. In other word, although the first switching element Q1 is turned on by the voltage level of the digital video data DATA induced along the first power supplying line 102 in a pause state in which the backlight operation power Vinv is cut off, it is impossible to supply the input voltage Vin to the input voltage terminal 51 of the DC-DC converter 261 because the backlight operation power Vinv is cut off. If the input voltage Vin does not be supplied to the input voltage terminal 51 of the DC-DC converter 260, the DC-DC converter can not be operated. Thus, it is possible to resolve a problem that the driving voltages VDD, VGH, VGL and Vcom are supplied to the driving circuits 220 and 230 and the liquid crystal display panel 210 via the output terminals 53 of the DC-DC converter 260 in the pause state.

As above-mentioned, the liquid crystal display device according to the invention includes a switching circuit connected between the system and the DC-DC converter. The DC-DC converter does not be operated by the switching circuit if either the module operation power or the backlight operation power is not input to the switching circuit. Accordingly, it is possible to effectively prevent the liquid crystal module from being operated abnormally by the data signal level induced in the pause state. As a result, according to the liquid crystal display device of the invention, it is possible to obtain effects that system loading time generated in changing the pause state into a normal play state can be reduced and power consumption can be reduced because the liquid crystal module does not be abnormally operated in the pause state.

It will be apparent to those skilled in the art that various modifications and variations can be made to the structure of the invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A liquid crystal display comprising:

a liquid crystal display panel configured to display a picture corresponding to a data;

a DC-DC converter configured to generate driving voltages necessary for driving the liquid crystal display panel;

a system configured to supply the data, a module operation power and a backlight operation power in a play state, and cutting off at least one of the module operation power and the backlight operation power while supplying the data in a pause state;

a switching circuit configured to output a first voltage depending on whether or not the module operation power and the backlight operation power from the system are supplied; and a backlight driving circuit that directly receives the backlight operation power from the system and generates a backlight driving signal for driving a backlight unit irradiating light on the liquid crystal display panel, wherein the switching circuit includes:

a resistor;

a first switching element having one terminal connected to one end of the resistor, another terminal connected to a ground, and a control terminal directly connected to a first power supplying line to which the module operation power from the system is supplied, and a second switching element having one terminal connected to a second power supplying line to which the backlight operation power from the system is supplied, another terminal connected to an input terminal of the DC-DC converter, and a control terminal connected to another end of the resistor, wherein the first and second switching elements are turned-on to supply an input voltage necessary for operating the DC-DC converter to the input terminal of the DC-DC converter during which the module operation power and the backlight operation power are supplied, and the first and second switching elements are turned-off to not supply the input voltage to the input terminal of the DC-DC converter during which any one of the module operation power and the backlight operation power is supplied, wherein the module operation power is directly supplied to the switching circuit, a gate driving circuit and a data driving circuit for driving the liquid crystal display panel, and a timing controller for controlling an operating timing of the display panel driving circuit, and the backlight operation power is supplied to the switching circuit and a backlight driving circuit.

2. The liquid crystal display according to claim 1, wherein the first switching element comprises a npn type bipolar junction transistor, and the second switching element comprises a pnp type bipolar junction transistor.

3. The liquid crystal display according to claim 1, wherein the first switching element comprises a n type metal-oxide semiconductor field effect transistor, and the second switching element comprises a p type metal-oxide semiconductor field effect transistor.

* * * * *